Figure 6:
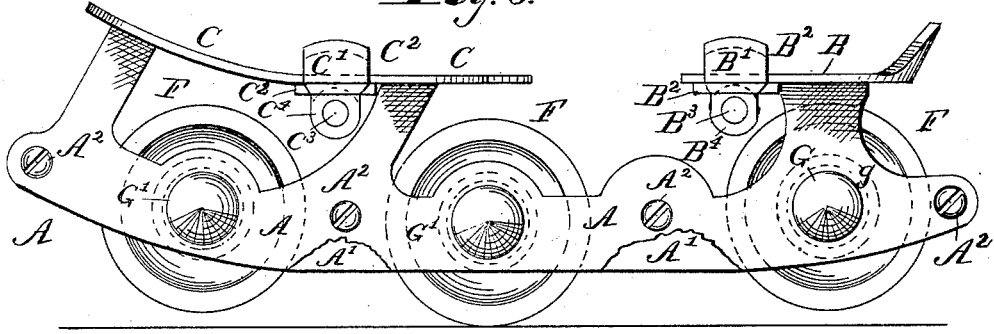

(No Model.) 3 Sheets—Sheet 1.
L. P. BRITT, Jr.
ROLLER SKATE.
No. 327,517. Patented Oct. 6, 1885.
Fig. 1.
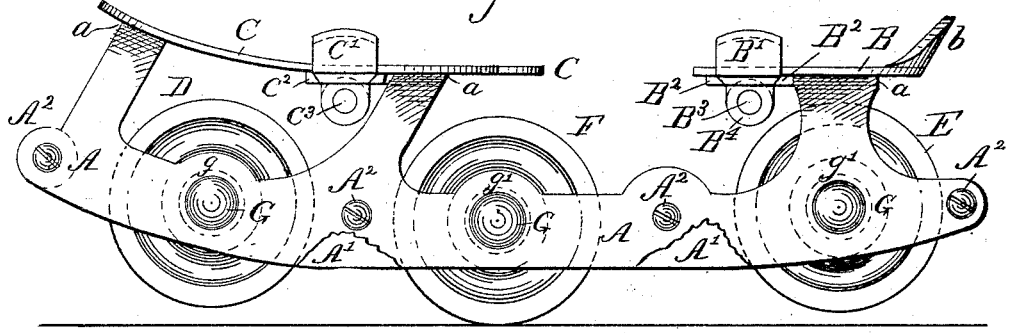
Fig. 4. Fig. 3. Fig. 5.
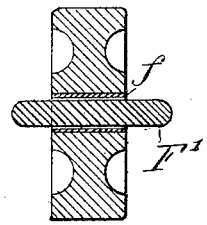  
Fig. 2.
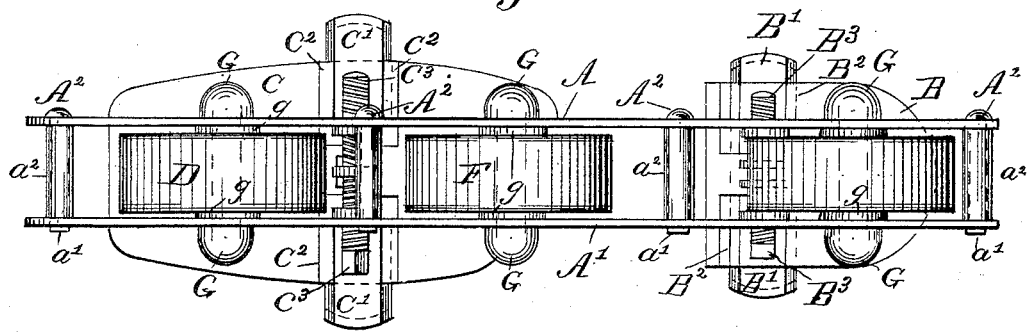
WITNESSES:
John C. Miller
E. Fred. Keller
INVENTOR
Lucas Parsons Britt Jr.
John B. Wolff,
Attorney.

(No Model.) 3 Sheets—Sheet 2.

L. P. BRITT, Jr.
ROLLER SKATE.

No. 327,517. Patented Oct. 6, 1885.

WITNESSES:
John C. Miller
C. Fred. Keller

INVENTOR
Lucas Pains Britt Jr.
Per John B. Wolff,
Attorney.

(No Model.) 3 Sheets—Sheet 3.
L. P. BRITT, Jr.
ROLLER SKATE.
No. 327,517. Patented Oct. 6, 1885.
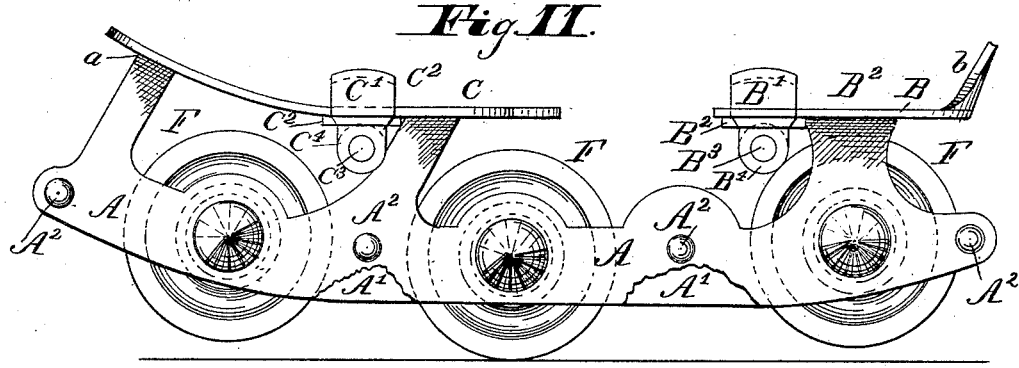
Fig. 11.
Fig. 14. Fig. 13. Fig. 15.
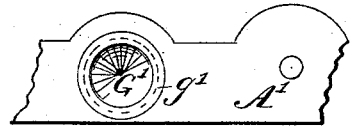
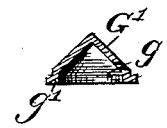
Fig. 12.
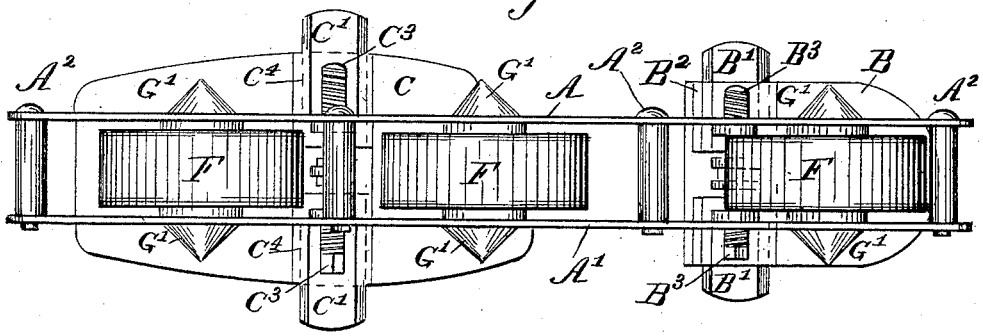
WITNESSES:
John C. Miller
Fred. Keller
INVENTOR
Lucas Pansoud Britt Jr.
Per John B. Wolff
Attorney.
N. PETERS, Photo-Lithographer, Washington, D. C.

UNITED STATES PATENT OFFICE.

LUCAS PARSONS BRITT, JR., OF NEW YORK, N. Y.

ROLLER-SKATE.

SPECIFICATION forming part of Letters Patent No. 327,517, dated October 6, 1885.

Application filed May 1, 1885. Serial No. 164,089. (No model.)

*To all whom it may concern:*

Be it known that I, LUCAS PARSONS BRITT, Jr., a citizen of New York city, in the county of New York and State of New York, have invented certain new and useful Improvements in Roller-Skates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this improvement is an easy-running, short-turning roller-skate having friction-bearings that can be quickly and economically removed and replaced by new parts when disabled by wear, and otherwise so constructed that the parts may be conveniently detached for the purpose of removing the rollers from the skate-frame, and thereby adapting the remaining parts for use as an ice-skate. These results are attained by the mechanism illustrated in the drawings herewith filed as part hereof, in which the same letters of reference denote the same parts in the different views.

Figure 9:
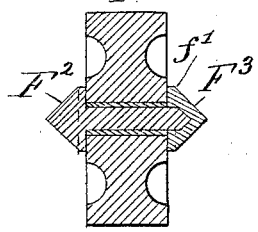
Figure 8:
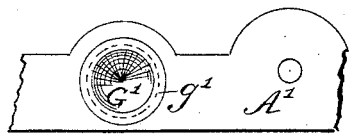
Figure 10:
Figure 7:
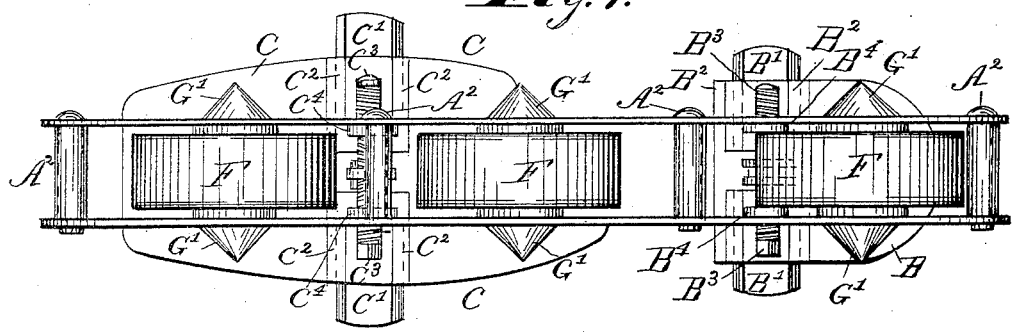

Figure 1 is a side elevation, partly in section, representing a roller-skate embodying the features of my improvement. Fig. 2 is a view of the same inverted. Fig. 3 is a section of one of the parts. Fig. 4 is a sectional representation of the roller and axle. Fig. 5 is a longitudinal section of the axle-bearing, more fully illustrating the construction thereof. Fig. 6 is a view of my improvement provided with conical axles and bearings for the same. Fig. 7 is a view of the same inverted. Fig. 8 is a section of one of the parts. Fig. 9 is a sectional representation of the roller provided with conical axle. Fig. 10 is a longitudinal section of the conical axle-bearing, more fully illustrating the construction of the same. Fig. 11 is a view of my improvement provided with rollers bearing conical axles and anti-friction ball-bearings for the rollers on the axles. Fig. 12 is a view of the same inverted. Fig. 13 is a section of one of the parts. Fig. 14 is a sectional view representing the roller provided with conical axle and anti-friction ball-bearings. Fig. 15 is a longitudinal section illustrating the construction of the axle-bearing for the same.

A A' are steel plates of any suitable thickness, secured to each other by means of screws $A^2$, provided intermediately of the plates with sleeves $a^2$, which, being of uniform length, hold said plates exactly parallel with each other. The relative positions of the plates A A' are additionally secured by means of screws, (not shown,) which enter screw-threaded perforations in inward flanges (indicated by dotted lines, as shown at $a\ a\ a$ in Fig. 1) of the plates A A' through suitably-located perforations in the heel-plate B and sole-plate C.

B' B' represent clutches for securing the skate to the heel. The clutches B' B' are affixed to the heel-plate B by means of plates $B^2\ B^2$, having beveled edges, which lap over correspondingly-beveled edges of the clutches B' B', which also connect with a right-and-left-threaded screw, $B^3$, by means of correspondingly-threaded eyes $B^4$, which may be made integral with or suitably affixed to the clutches B' B', which, by means of the screw $B^3$, are adjusted as occasion may require for affixing the skate to or detaching it from the foot.

The sole-plate C is provided with similar clutches, C', affixed thereto by beveled plates $C^2\ C^2$, and provided with eyes $C^4$, which connect the said clutches C' C' with a right-and-left-threaded screw, $C^3$, by means of which the clutches are adjusted as occasion may require.

G G G are journal-boxes or bearings for the axes F' of the rollers F. These bearings are made distinct from the plates A A', which are provided with perforations, into which the boxes G are inserted. The shoulders $g$ of the boxes G serve the double purpose of securing the boxes to the plates A A' and giving a proper position to the rollers F intermediately to the plates A A'. The boxes G are provided with perforations $g'$, for the introduction of lubricating matter to the axes F', and thereby preventing undue wear of the parts. The boxes G are additionally secured to the plates A A' by means of solder.

F F F are rollers provided with metal linings, as shown at $f$ in Fig. 1, to protect the same from wear by friction with their axes F', which are movably fitted to both the rollers and the boxes G, in order that the said axes may move or rotate more or less, and by continually changing their relative positions to the roller-bearings thus cause the wear due to the friction of the parts to be distributed or divided around the bodies of the axes, and by thus keeping the wear uniform secure greater uniformity and smoothness in the rotation of the rollers than is otherwise practicable.

The middle roller is set in a position out of line with the front and rear rollers, as shown in Fig. 1, for a purpose hereinafter set forth.

Referring to the figures of Sheet 2 of the drawings, illustrating my improvement provided with conical journals and boxes or bearings, the rollers F have metal linings $f$, the same as that shown in Fig. 4.

F' is the axis proper, provided with a conical head, $F^2$, made integral therewith. Its opposite end screws in a conical nut, $F^3$, of corresponding size, which completes the formation, as fully illustrated in Fig. 9.

G' G' G' represent the conical boxes or bearings for the axes F' $F^2$ $F^3$. They are provided with oil-holes $g$ and shoulders $g'$, for the purpose previously set forth, and are secured to the plates A A' in the same manner as set forth for the boxes G.

The axes F' $F^2$ $F^3$ are movably fitted to the rollers F and their bearings G' G' G', in order that they may rotate more or less, and thus continually change their relative positions to the bearing of the rollers for the purpose of equalizing the wear of the axes, as before mentioned.

Referring to the figures of Sheet 3 of the drawings, illustrating my improvement provided with conical journals, and boxes or bearings for the same, and anti-friction ball-bearings for the rollers, F' is the axis, provided with an integral conical head. $F^2$, having a concaved inner extension, $f^2$. Its opposite end screws into a similarly-formed conical nut, $F^3$, of corresponding size, which completes its formation, as fully shown in Fig. 14. The roller F is provided with a metal lining, $F^4$, of sufficient thickness to be provided with concaved recesses on each side corresponding in size to the similarly-recessed inner extensions of the conical nut $F^3$ and axis-head $F^2$, thus forming a recess for the reception of a suitable number of balls, H, as shown in Fig. 14, for the purpose of reducing the friction due to a different construction, and thus serve the double purpose of protecting the parts against wear and securing greater ease of locomotion.

Referring to the modification illustrated in Fig. 16, F is the roller. $F^4$ is metal lining provided with concaved recesses. $F^5$ are concaved washers movably fitted to the axis F'. H H are the anti-friction ball-bearings held in place, as shown, by the roller-lining $F^4$ and the concaved washers $F^5$, the outer sides of which bear against the shoulders $g'$ of the journal boxes or bearings $g$.

By reason of the manner in which the journal boxes or bearings G and G' are constructed and secured to the plates A A', by soldering, they may be removed and readily replaced by new parts of the same construction; or they may be replaced by the conical boxes or bearings and rollers having corresponding parts; or the rollers F may be removed and replaced by rollers provided with anti-friction ball-bearings, as illustrated in Fig. 16. By reason of the central roller being set in a position out of line with the end rollers, it will act as a pivot on which to turn in any direction desired, and thus enable the skater to make quicker and shorter turns than could otherwise be possible. By removing the screws connecting the heel and sole plates to the flanges $a$ $a$ $a$ of the plates A A' and the transverse screws $A^2$ the rollers and their axes may be removed, the plates again readily connected without said parts, and the remaining mechanism can be used for an ice-skate having double runners.

Having explained the construction and operation of my improvement, what I claim as new, and desire to secure by Letters Patent, is—

A roller-skate having detachable and interchangeable parts, substantially as specified, convertible into an ice-skate with double runners, as set forth.

In testimony whereof I affix my signature in presence of two witnesses.

LUCAS PARSONS BRITT, JR.

Witnesses:
JAMES DEMAREST,
WILBUR FISK.